(12) United States Patent
Brockhoff et al.

(10) Patent No.: US 9,446,905 B2
(45) Date of Patent: Sep. 20, 2016

(54) FEED DEVICE AND METHOD

(71) Applicant: KUKA SYSTEMS GMBH, Augsburg (DE)

(72) Inventors: Per-Olaf Brockhoff, Friedberg (DE); Yuecel Kara, Augsburg (DE)

(73) Assignee: KUKA SYSTEMS GMBH, Augsburg (DE)

( * ) Notice: Subject to any disclaimer, the term of this patent is extended or adjusted under 35 U.S.C. 154(b) by 0 days.

(21) Appl. No.: 14/412,540

(22) PCT Filed: Jul. 2, 2013

(86) PCT No.: PCT/EP2013/063881
§ 371 (c)(1),
(2) Date: Jan. 2, 2015

(87) PCT Pub. No.: WO2014/006014
PCT Pub. Date: Jan. 9, 2014

(65) Prior Publication Data
US 2015/0191315 A1 Jul. 9, 2015

(30) Foreign Application Priority Data
Jul. 3, 2012 (DE) .................... 20 2012 102 447 U

(51) Int. Cl.
*B65G 37/00* (2006.01)
*B65G 35/00* (2006.01)
*B65G 1/08* (2006.01)
*B23Q 7/08* (2006.01)
*B65G 47/56* (2006.01)

(52) U.S. Cl.
CPC ............... *B65G 35/00* (2013.01); *B23Q 7/08* (2013.01); *B65G 1/08* (2013.01); *B65G 47/56* (2013.01)

(58) Field of Classification Search
CPC B65G 47/684; B65G 47/5145; B65G 35/06; B65G 35/08
USPC ....................... 198/861.5, 580, 562
See application file for complete search history.

(56) References Cited

U.S. PATENT DOCUMENTS

| 2,535,715 | A | | 12/1950 | Anderson | |
| 3,093,229 | A | * | 6/1963 | Scheidenhelm | A01D 46/22 193/28 |
| 3,392,813 | A | | 7/1968 | Trautmann | |
| 4,485,910 | A | * | 12/1984 | Tabler | B65G 1/08 193/36 |

(Continued)

FOREIGN PATENT DOCUMENTS

| DE | 199 53 812 A1 | 5/2001 |
| DE | 10 2010 011397 A1 | 9/2011 |

(Continued)

*Primary Examiner* — James R Bidwell
(74) *Attorney, Agent, or Firm* — McGlew and Tuttle, P.C.

(57) ABSTRACT

An apparatus (1) for feeding components has a downwardly inclined guide path (6), a mobile component carrier (4), which is connected in a releasable manner to the guide path (6), and interacting rolling bodies and rails (15, 16) on the guide path (6) and on the component carrier (4). The feed apparatus (1) has a loading location (10), at which a component carrier (4) is connected to the guide path (6), and possibly loaded with one or more components (3), by a worker (12), using a manually operable transfer apparatus (14), which can be actuated by applying manual force counter to a restoring element (31, 40). The transfer apparatus (14) is designed as a preliminary-positioning apparatus (20) for a loose component carrier (4).

20 Claims, 8 Drawing Sheets

(56) References Cited

U.S. PATENT DOCUMENTS

| | | | |
|---|---|---|---|
| 5,350,270 A | 9/1994 | Stallard et al. | |
| 6,186,725 B1 * | 2/2001 | Konstant | B65G 1/08 193/36 |
| 6,471,461 B2 * | 10/2002 | Muilwyk | B65G 57/00 103/134 |
| 7,553,118 B1 * | 6/2009 | Doepker | B65G 1/08 198/347.2 |

FOREIGN PATENT DOCUMENTS

| | | |
|---|---|---|
| EP | 0 092 390 A2 | 10/1983 |
| WO | 2009068241 A1 | 6/2009 |

\* cited by examiner

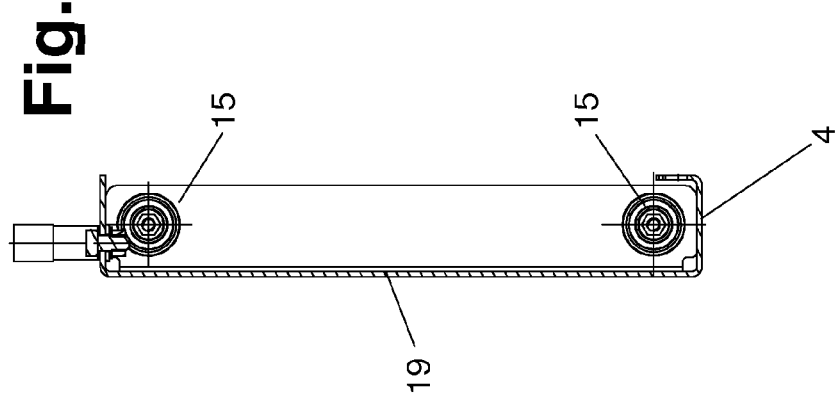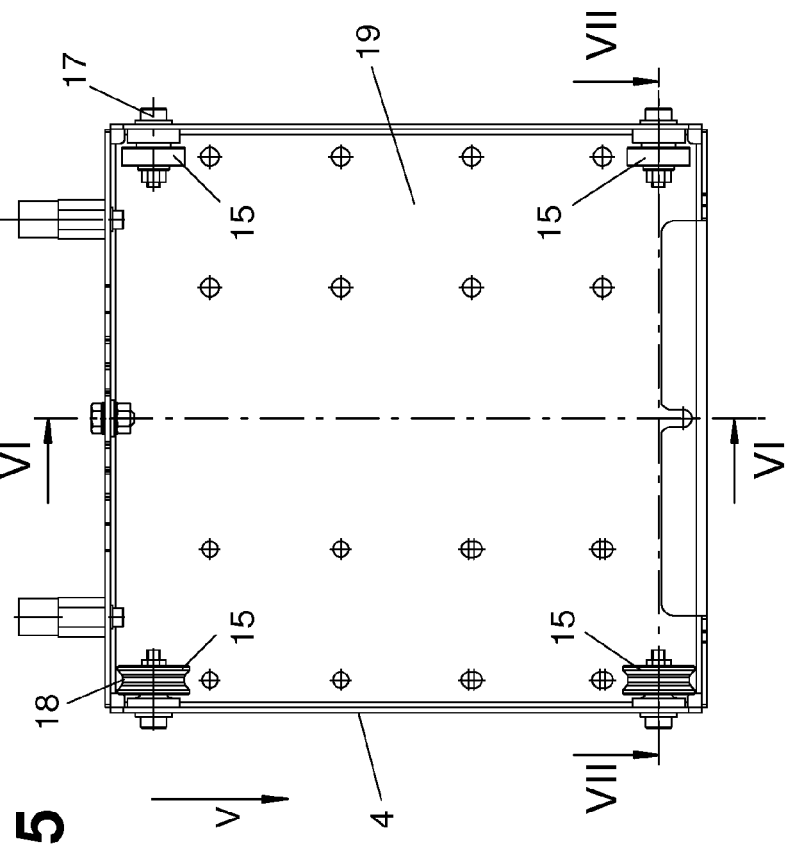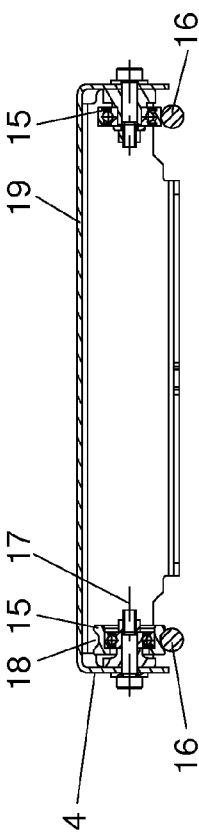

FEED DEVICE AND METHOD

CROSS REFERENCE TO RELATED APPLICATIONS

This application is a United States National Phase Application of International Application PCT/EP2013/063881 filed Jul. 2, 2013 and claims the benefit of priority under 35 U.S.C. §119 of German Patent Application DE 20 2012 102 447.0 filed Jul. 3, 2012, the entire contents of which are incorporated herein by reference.

FIELD OF THE INVENTION

The present invention pertains to a feed device having a downwardly sloped guide path, a mobile component carrier detachably connected with the guide path and interacting sliding and guiding devices, especially rolling bodies and rails, on the guide path and on the component carrier, wherein the feed device has a loading site, at which a component carrier is connected by a worker with the guide path and optionally loaded with one or more components and a method of feeding components by means of the feed device.

BACKGROUND OF THE INVENTION

Such a feed device is known from WO 2009/068241A1. It has a downwardly sloped guide path and a mobile component carrier, which can be detachably placed on the guide path and connected with same, wherein said guide path and the component carrier have interacting rolling bodies and rails. The feed device has a loading site, at which a worker removes a component carrier from a second guide path designed as a return path and places same on the first-mentioned guide path. In addition, the worker loads the component carrier at the loading site with one or more components.

SUMMARY OF THE INVENTION

An object of the present invention is to provide an improved feed technique.

According to the invention, a feed device for components is provided. The feed device has a downwardly sloped guide path, a mobile component carrier detachably connected with the guide path and interacting sliding and guiding devices, especially rolling bodies and rails, on the guide path and on the component carrier. The feed device has a loading site, at which a component carrier is connected by a worker with the guide path and optionally loaded with one or more components. The feed device at the loading site has a manually operable transfer device, actuatable with manual force against the restoring element, for the positioned transfer of a component carrier to the guide path.

The feed device according to the invention with the transfer technique or transfer device has the advantage that it facilitates the work of the worker and improves ergonomics. In addition, it may lead to improved and simpler positioning of a component carrier at the time of transfer to the guide path.

Further, the performance capacity and the operational reliability as well as the availability of the feed device are increased. The feed device and the transfer technique can be operated in a simple manner, require less design effort and are especially economical.

The transfer technique being claimed has the advantage that it makes manual operation possible and manages on the manual force of the worker. A restoring element offers relief or simplification of operation and may possibly compensate the loads to be moved. The transfer device being claimed manages without motor drives and the control means thereof. This considerably reduces the design effort and the effort needed in terms of safety. In particular, the safety requirements imposed by the European Machinery Directive can be eliminated.

There are various possibilities for embodying the transfer device being claimed. On the one hand, the transfer device may be designed as a prepositioning device for a manually transferred, loose component carrier. Prepositioning facilitates the rapid and accurate positioning and transfer of component carriers. It relieves, in addition, the sliding and guiding devices, especially the sliding devices designed as rolling bodies. The sliding and guiding devices do not yet come into contact in an elevated placement position. This happens only in a lowered transfer position with a controlled and largely force- and shock-free motion, while an exact and possibly positive-locking meshing (engaging) of the sliding and guiding means may, besides, be ensured.

The sliding devices, especially rolling bodies, are preferably arranged at the one or more component carriers, and the guiding devices, especially rails, at the guide path or guide paths. The association may also be reversed.

The transfer device may be designed, on the other hand, as a lifting device, with which a section of the path together with a component carrier located thereon is moved, preferably with a vertical direction component. This relieves the worker of lifting tasks and improves ergonomics, as well as the performance capacity of the worker and the feed device.

The lifting device has special advantages in case of a feed device that has a plurality of guide paths for the forward and return motions of loaded and empty component carriers. In addition, a component carrier can be brought with the lifting device into a position that is favorable for the load and loaded there by the worker with one or more components.

The lifting device is preferably designed as a pivoting device, which has especially simple and safe kinematics and in which the restoring element may be designed as a counterweight in a simple manner. If a plurality of guide paths arranged one on top of another have different slopes, the lifting device may have a device for adapting the slope of the path section to the respective guide path.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a bottom view of a component carrier with rolling bodies;

FIG. 6 is a longitudinal view through the component carrier according to section line VI/VI in FIG. 5;

FIG. 7 is a cross section through the component carrier according to section line VII/VII in FIG. 5;

DESCRIPTION OF THE PREFERRED EMBODIMENTS

Figure 1:
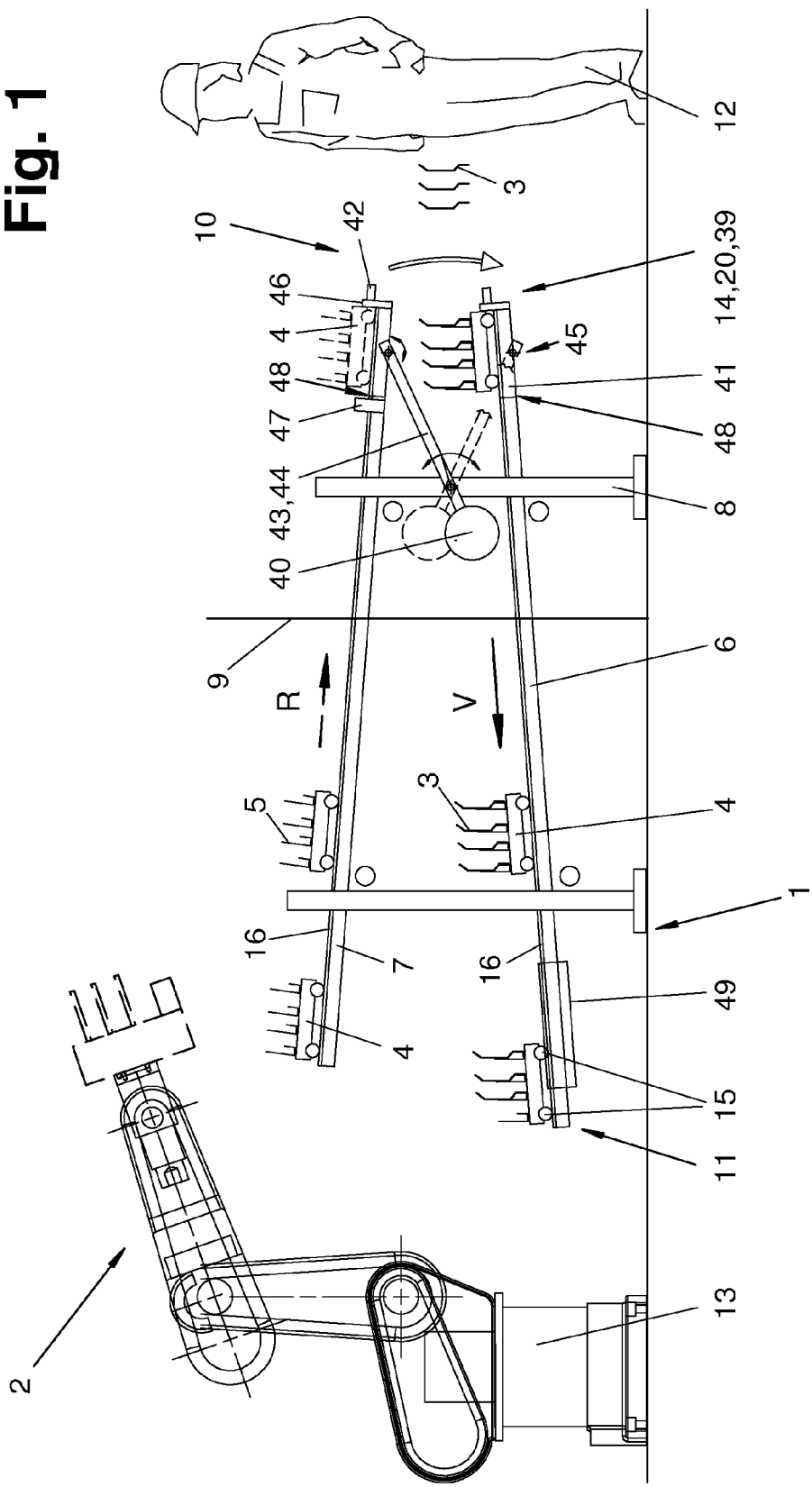
FIG. 1 is a schematic side view of a feed device with a plurality of guide paths, mobile component carriers and a transfer device at a loading site.

Referring to the drawings, the present invention pertains to a feed device (1) for components (3). The present invention pertains, further, to a transfer device (14) at the feed device (1) in different embodiments. Further, the present invention pertains to the corresponding methods as well as to a machining station (2).

Figure 2:
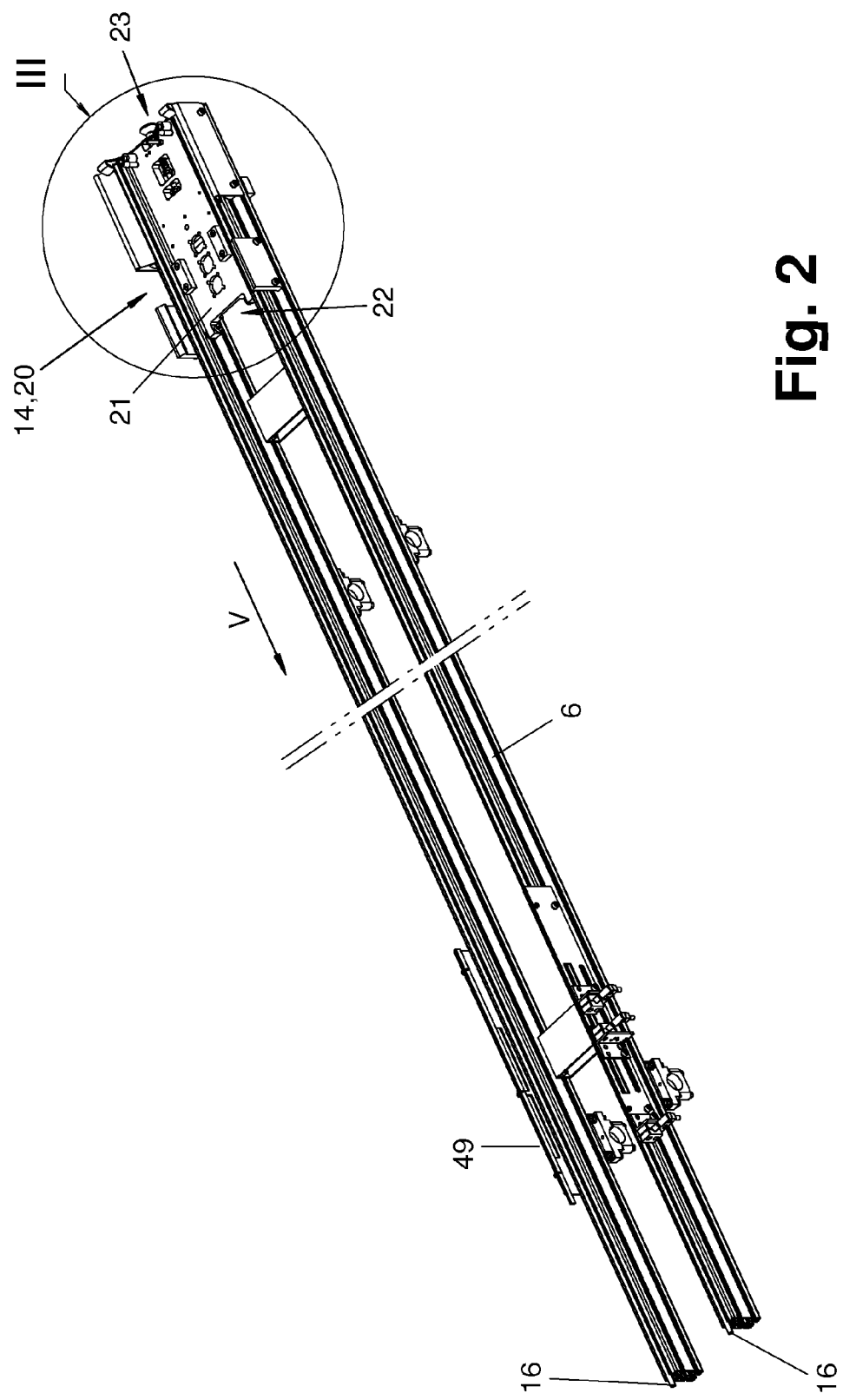
FIG. 2 is a perspective and cut-away top view of a guide path with a prepositioning device.

In a schematic side view, FIG. 1 shows a feed device (1) in a machining station (2). The feed device (1) has at least one guide path (6), which has an obliquely downwardly directed slope and which extends from a loading site (10) to an unloading site (11). FIG. 2 shows such a guide path (6) in a cut-away and perspective top view.

The guide path (6) is arranged on a frame (8) and its slope may be able to be set. It has a finite length and preferably extends in a straight line. The end of the path at the loading site (10) is located higher than the end of the path at the unloading site (11).

The feed device (1) is used to feed components (3) from the loading site (10) to the unloading site (11), wherein one or more mobile component carriers (4), which are detachably connected with the guide path (6) and move along same under the force of gravity, are provided for transporting the components. The guide path (6) acts here as a feed path for loaded component carriers (4).

The component carriers (4) have one or more fixed or optionally replaceable component mounts (5) for one or more components (3) each. These are preferably body parts for vehicle body shells, especially sheet metal parts. The components (3) may be of any type and size. They may be identical to one another or different from one another. Different components (3) may belong together and form one set. The components (3) are loaded at the loading site (10) by a worker (12) onto the component carrier or component carriers (4). Preferably automated unloading takes place at the unloading site (11) by means of a machining device (13), which may have, e.g., a multiaxial robot shown in FIG. 1 with a gripping device.

The component carrier or component carriers (4) and the guide path (6) have interacting sliding and guiding devices (15, 16). The sliding devices (15) are preferably designed as rolling bodies, especially as wheels, and the guiding devices (16) as rails. In the embodiment shown, the sliding devices (15) or rolling bodies are located at the component carrier or component carriers (4), and the guiding devices (16), especially rails arranged in pairs, are arranged on the guide path (6). The association may be alternatively reversed, in which case the guide path (6) is designed as a roller path. In another variant, the component carrier or component carriers (4) and the guide path (6) may have both sliding devices (15) and guiding devices (16) which mutually mesh with one another.

At its end area located towards the unloading site (11), the guide path (6) may have a positioning device (49), with which the arriving component carriers (4) can be stopped and positioned in a position suitable for unloading. In addition, if a stack of a plurality of component carriers (4) is possibly formed, separation followed by said positioning may take place at the positioning device (49). FIGS. 1 and 2 show this positioning device (49).

In addition, another guide path (7), which is arranged at a vertically spaced location above the feed path (6) and which extends from the unloading site (11) to the loading site (10) with a slope directed in the opposite direction, is present in the embodiment shown in FIG. 1. It acts as a return path (7) for the return of empty component carriers (4) to the loading site (10) and is likewise arranged at the frame (8). The arrangement in height may also be transposed, in which case the feed path (6) is arranged above the return path (7).

The return path (7) preferably has the same design as the feed path (6). A plurality of guide paths (6, 7) may also be present. Arrows (V, R) in FIG. 1 mark the forward direction and the return direction, respectively. In such a feed device (1) with feed and return path(s) (6, 7), the component carriers (4) move in a closed circuit, in which they are transferred at the loading and unloading sites (10, 11) from one guide path to the other. This may take place in an automated manner at the unloading site (11), e.g., by means of the robot (13) shown with the gripping device. As an alternative, a separate transfer device may be present.

At the loading site (10), the feed device (1) has a transfer device (14) for the positioned transfer of a component carrier (4) to the guide path or feed path (6), which said transfer device can be operated manually by a worker (12) and actuated with manual force. The manual operation and actuation may take place against a restoring element (31, 40).

The transfer device (14) and the corresponding transfer method may have various designs. The transfer device (14) may be designed, in particular, as a prepositioning device (20), especially as a placement aid, and/or as a lifting device (39), especially as a transfer aid.

FIG. 1 shows a lifting device (39) with its parts, wherein a prepositioning device (20), which may possibly be additionally present, is only suggested. FIGS. 2 through 10 show a prepositioning device (20) in detail.

The lifting device (39) shown in FIG. 1 is used to transfer a component carrier (4) from the return path (7), which is located higher in FIG. 1, onto the feed path (6), which is located lower, wherein the worker (12) operates the lifting device (39) manually and actuates it manually against a restoring element (40). The component carrier is transferred in a positioned manner during this transfer to the guide path or the feed path (6).

The transfer of a component carrier (4) is brought about by a lifting motion of a path section (41) of the guide path (6) together with a component carrier (4) arranged on the path section (41), wherein said lifting motion is performed by the lifting device (39). The lifting motion has a vertical direction component. The path section (4) is preferably an end section of the guide path (6). If a return path (7) is also present, as in FIG. 1, the mobile path section (41) may be assigned to both guide paths (6, 7) and movable between these. In one embodiment variant, not shown, the return path (7) may be eliminated, and one or more empty component carriers (4) may be fed to the loading site (10) in a different way, e.g., stacked up on a rack, and pushed over onto the mobile path section (41) of the feed path (6).

In the feed device (1) according to FIG. 1, the lifting motion takes place downwardly to the lower feed path (6) during the transfer of a component carrier (4) from the upper return path (7). The arrangement may also be reversed, in which case the lifting motion is directed upwards toward the feed path (6) located higher.

In the embodiment shown in FIG. 1, the lifting motion of the path section (41) with the component carrier (4) takes place directly from the return path (7) to the feed path (6), and the component carrier (4) can be loaded by the worker (12) with components (3) at the transfer and coupled position at the feed path (6). The completely loaded component carrier (4) rolls downward on the feed path (6) after a safety check and the subsequent release. The empty path section (41) can then be moved back to the return path (7) under the action of the restoring element (40) and can pick up the next empty component carrier (4) there.

In a variant of this embodiment and process function, the lifting device (39) may be locked, if needed, with a corresponding device in at least one intermediate position between the guide paths (6, 7), which is ergonomically more favorable for the worker (12) for loading with components. This may optionally also be a lifted position below the feed path (6), in which case lifting is again carried out in the upward direction and subsequently onto the guide path (6) for the subsequent transfer of the path section (41) with the loaded component carrier (4).

The path section (41) forms an end section in both guide paths (6, 7). The path section (41) may now be coupled flush with the respective guide path (6, 7) and secured and locked in the coupled position with a coupling device (48). The path section (41) is preferably aligned here with the particular coupled guide path (6, 7) and assumes the slope angle thereof. The path section (41) will then change its slope during the lifting motion and become adapted to the slope of the other guide path. The lifting device (39) has a separate device (45) for slope adaptation for this slope change, which is preferably a pivoting motion schematically indicated by arrows in FIG. 1.

The lifting device (39) has an operating device (42) for the worker (12) and a restoring element (40). The operating device (42) is designed, e.g., as a grip at the free end of the path section (41). The restoring element (40) may be designed as a spring or, as in FIG. 1, as a counterweight or in any other desired manner.

The web section (41) has, in addition, a positioning device (46) for the component carrier (4), which is designed, e.g., as a stop at the free end of the path section (41). In addition, the positioning device (46) may have a clamping device for the temporary fixation of the component carrier (4) during the lifting motion.

The lifting device (39) may have various designs. In the embodiment according to FIG. 1, the lifting device (39) has a pivoting device (43) with one or more connecting rods (44), which are preferably arranged on the frame (8) and are mounted rotatably. A counterweight is suitable for use in such an embodiment as a restoring element, which is arranged at the rearward end of the connecting rod beyond the mounting point.

The slope adaptation device (45) may be connected or coupled with the pivoting device (43) in a suitable manner. If a connecting rod mechanism with corresponding kinematics is used, the slope of the path section (41) can also be changed at the same time during the lifting and pivoting motion of the path section (41). Said device (45) may be formed in another variant, for example, by a separate adjusting element, which is arranged on the pivoting device (43) itself or alternatively stationarily on the frame (8) or one of the guide paths (6, 7) and, e.g., it rotates the path section (41) by a stop in the vicinity of the coupled position and thereby adapts the slope. In another variation, a controllable adjusting element, e.g., a lifting cylinder or the like may be used as the device (45).

In another variant, not shown, the lifting device (39) may be designed as a linear unit or as a combined pivoting and linear unit and have corresponding kinematics for performing the lifting motion and optionally the slope adaptation. The operation is carried out manually by the worker (12) and with his manual force in this case as well, and the restoring element may have another, suitable design, e.g., it may be designed as a spring.

The feed device (1) may have, furthermore, a safety device (47). This may be arranged, e.g., in FIG. 1, on the return path (7), and it detects the coupled and flush position of the path section (41). In addition, it blocks the end of the path for arriving empty component carriers (4) during the presence of the path section (41). On the other hand, it can check whether a component carrier (4) has rolled onto the coupled path section (41) and assumes the correct position there after release. The safety device (47) may have one or more corresponding sensors, analyzing units and display devices for this.

A similar safety device (47) may also be arranged at the feed path (6). This may check, e.g., the loading of the component carrier (4) for completeness and for the presence of the correct components (3). This is especially important if a set of different components (3), which belong together, e.g., for a common assembly, is loaded on a component carrier (4). It must be ensured in case of automatic unloading that the correct components (3) are arranged completely and at the correct site of the component carrier (4). Similar requirements also arise during the assembly and joining of components (3) combined in a group or a set. The feed path (6) may have, besides, an aid at the loading site (10) for reliably starting the loaded component carrier (4).

The rolling bodies (15) are freely rotatable in the feed device (1) shown in FIG. 1. As an alternative, a braking device, especially a regenerative brake, which can be set or controlled depending on the direction of travel and rotation and can be adapted, moreover, to different slope angles of the guide paths (6, 7), may be associated with one or more rolling bodies (15). A generator brake may be formed, e.g., by a generator driven by the rolling body, preferably a d.c. generator, and a load circuit with one or more power consumers, e.g., ohmic resistors, in an optionally switchable arrangement.

FIGS. 5 through 7 show as an example the design of a component carrier (4). This has, e.g., a body (19), which is designed as a cuboid, beveled and thin-walled sheet metal housing, which is downwardly open and has an attachment surface for one or more component carriers (5) shown in FIG. 1 on the top side, optionally with grid-like connection sites. The rolling bodies or wheels (15) are mounted on the corner areas of the body (19) and on the beveled side walls and rotate about an axis (17) directed at right angles to the respective direction of run (V, R).

As is illustrated in FIGS. 5 and 7, the wheels (15) may have, on a long side of the body (19), an uneven circumferential contour and a circumferential contour adapted to a likewise uneven guiding device (16), which contour is designed, e.g., as a circumferential groove (18). The guiding device (16) may be designed as a rounded rail and mesh with the groove (18) in a positive-locking manner. On the other side of the body, the wheels (15) may have a cylindrical running surface, which does not have to have a positive-locking connection with the guiding device (16), which may likewise be designed as a rounded rail here. As an alternative, the wheels (15) may have a lateral guide collar.

The transfer device (14) may also be designed in the above-mentioned manner as a prepositioning device (20), especially as a placement aid. FIGS. 2 through 4 and 8 through 10 show this design.

The prepositioning device (20) is intended and designed for a loose component carrier (4), which is transferred by the worker (12) manually, with the worker removing, e.g., an empty component carrier (4) from the return path (7) and transferring it to the feed path (6). The worker (12) may place the component carrier (4) on the prepositioning device (20) with an initial distance from the guide path (6) in a predetermined position and fix same temporarily and subsequently transfer it to the guide path (6) and cause the sliding and guiding devices (15, 16) located at the shortest distance to mesh. The prepositioning device (20) has for this a mount (21) mounted movably relative to the guide path (6) for a component carrier (4) and a moving device (22) that can be operated manually and actuated with manual force for the mount (21).

Figure 4:
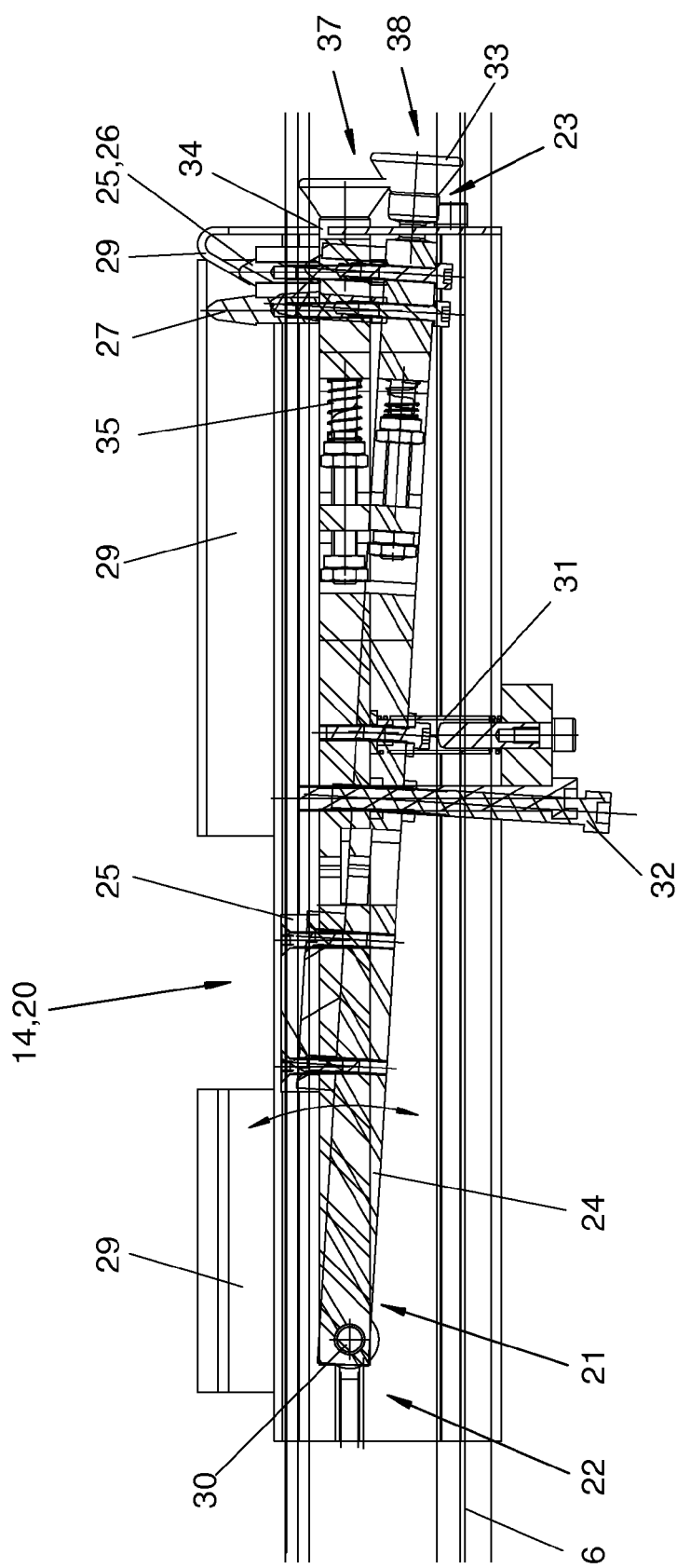
FIG. 4 is a partially cut-away side view of the prepositioning device according to FIGS. 2 and 3 with a view of a placement and transfer position.

For the prepositioning and the subsequent transfer of a component carrier (4), the mount (21) may be movable between an elevated placement position (37) and a lowered transfer position (38), as this is shown in FIG. 4. The sliding and guiding devices (15, 16) are located at spaced locations from one another in the placement position (37) and mutually mesh with each other in the transfer position (38). The sliding and guiding devices (15, 16) may be designed as rolling bodies and rails in the above-described manner. Possible shock loads at the time of placement of the component carrier (4) are directed due to the initial distance only onto the body (19), but not to the relatively small and delicate bearings of the rolling bodies or wheels (15) of the component carrier (4). This is also true in case of a kinematic reversal and when rolling bodies (15) are arranged on the guide path (6).

The moving device (22) has an operating device (23) and a restoring element (31). The restoring element (31) can force the mount (21) into the placement position (37) and must be overcome by the worker (12) for transferring the component carrier (4) and for assuming the transfer position (38). A stop (32) limits the restoring motion of the restoring element (31), which is designed, e.g., as a spring.

Figure 3:
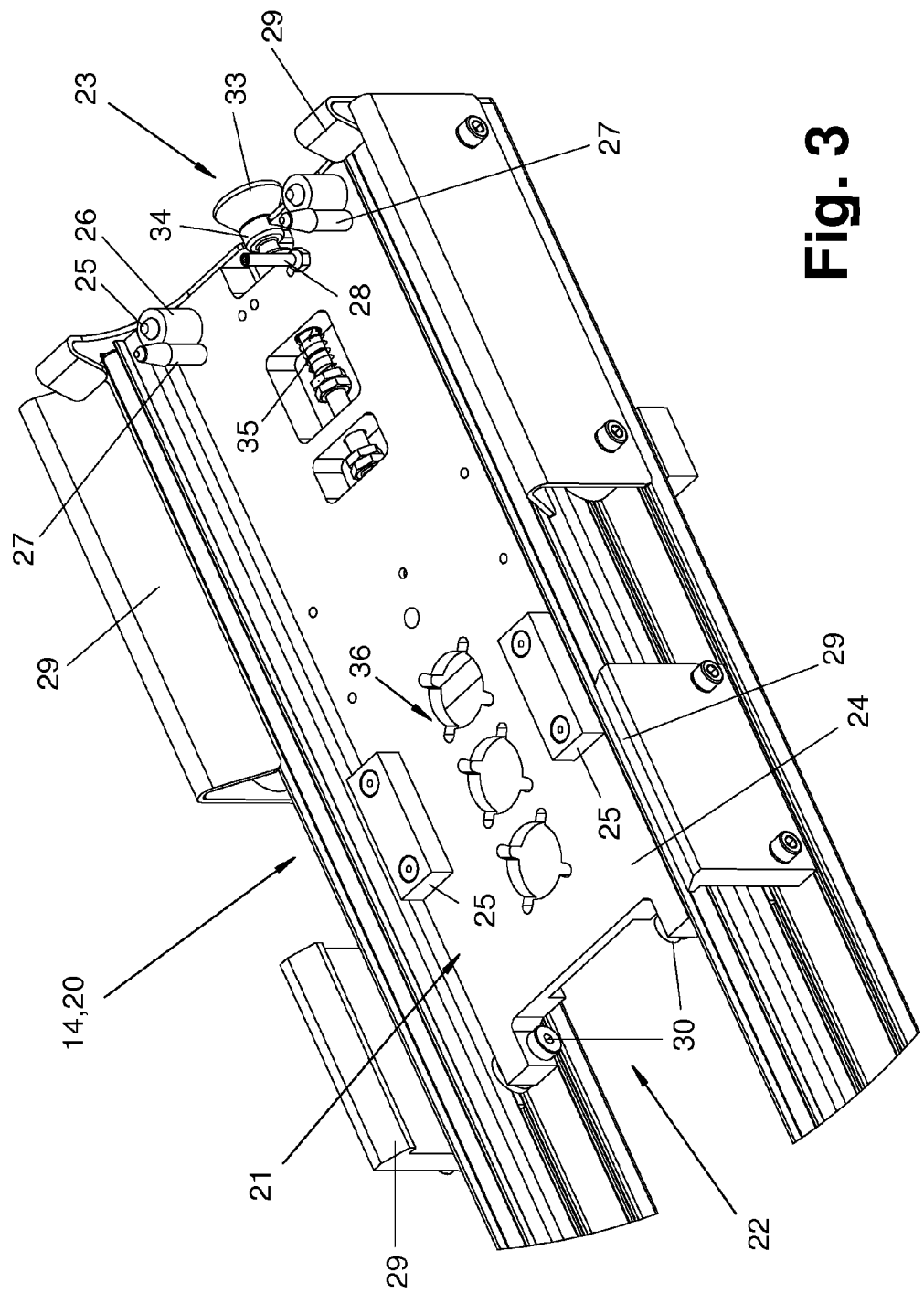
FIG. 3 is a cut-away and enlarged detail view of the prepositioning device according to FIG. 2.

According to FIGS. 2 and 3, the mount (21) is arranged in the end area of the guide path (6) and may be mounted, e.g., at the guide path (6). As is illustrated in FIG. 2, the guide path (6) may have two parallel longitudinal beams and a plurality of distributed crossbeams, wherein the guiding devices (16), especially rails, are arranged on the top side of the longitudinal beams. The mount (21) may be arranged in the free space between the longitudinal beams.

The kinematics for the motion of the mount (21) between the placement and transfer positions (37, 38) and the corresponding mounting can be selected as desired. An individual pivot bearing (30), which is connected with the two longitudinal beams, is used in the exemplary embodiment being shown. The mount (21) is designed here as a pivotable rocker, which is pressed upward by the restoring element (31). As an alternative, a connecting rod mechanism, especially with parallel arms, with which the mount (21) can be raised and lowered with the slope remaining constant, may be present for mounting. Other mounting designs, e.g., a pushing guide or the like, are possible as an alternative.

Figure 8:
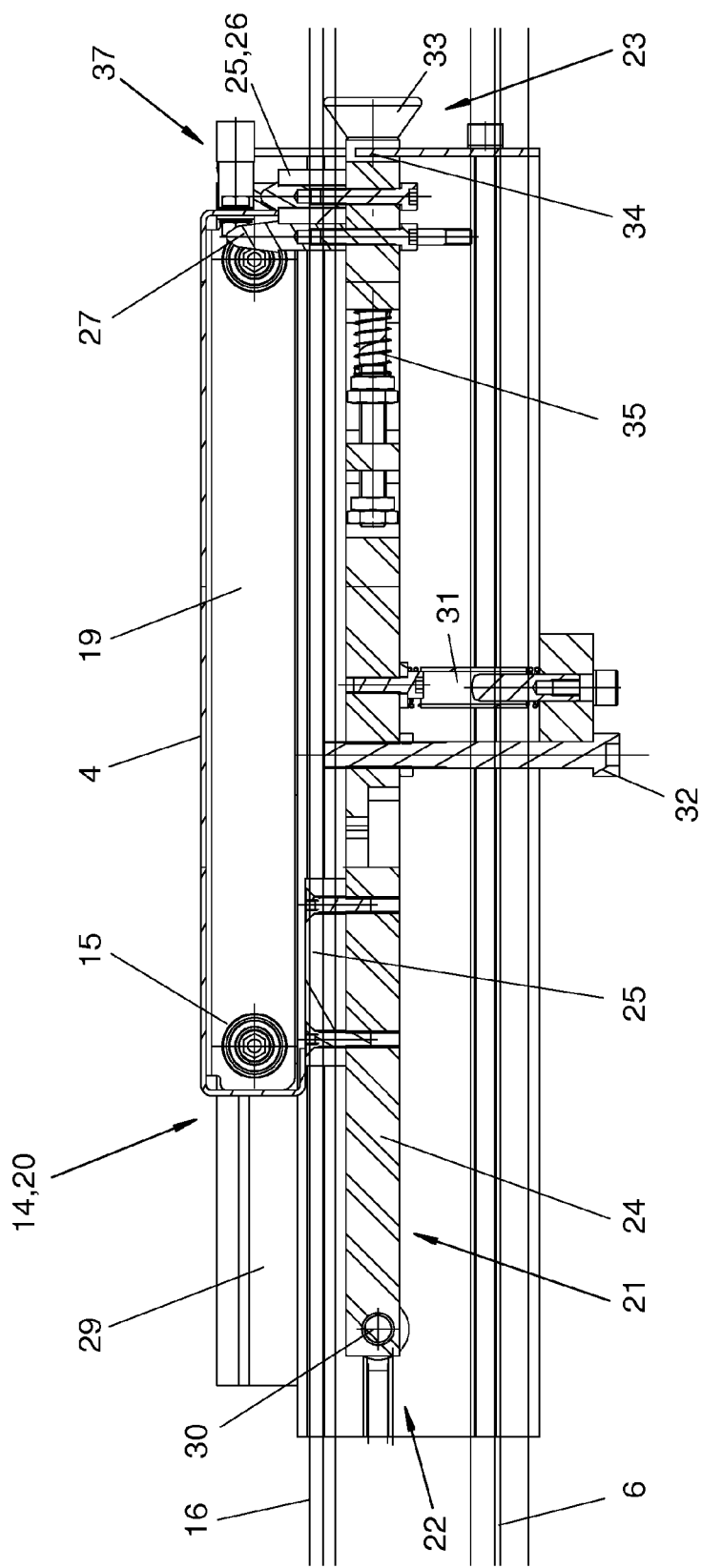
FIG. 8 is a view showing the prepositioning device in one of different operating positions during the positioning and transfer of a component carrier to a guide path.

In the rocker arrangement shown, the mount (21) assumes in the placement position (38) a position that is parallel to the guide path (6) and is spaced vertically upward. FIGS. 4 and 8 show this orientation. In the transfer position (38), the mount (21) is pivoted down and dips into the guide path (6) at least in some areas, and the component carrier (4) is transferred to the guide path (6) and is detached from the mount (21).

As is illustrated in FIG. 3, the mount (21) comprises, e.g., a plate-shaped carrier (24), at one end of which, which points towards the unloading site (11), the pivot bearing (30) is arranged. A plurality of elevated support devices (25), with which the body (19) strikes and with which it comes into contact when placing the component carrier (4), are arranged on the top side of the carrier. One or more support devices (25) may have an absorbing element (26) in order to absorb shock loads during the placement. Some of the support devices (25) may be designed, e.g., according to FIG. 3 as cuboid blocks and be arranged at the edge of the carrier (24). Support devices (25), which are designed, e.g., as upright pins with the said absorbing elements (26), may likewise be arranged at the end of the carrier located opposite the pivot bearing (30). Buffer bodies made of an elastic material, e.g., plastic or the like, may be used as absorbing elements.

The mount (21) has, further, one or more positioning devices (27), which become meshed for positioning with the component carrier (4), especially with the body (19) thereof, in a positive-locking manner. The positioning devices (27) are designed, e.g., as two mandrels located at spaced locations from one another with conical tips, which are located at the edge of the carrier located opposite the bearing (30) and mesh from below with corresponding openings on the body (19). The positioning devices (27) may be arranged in the proximity of the above-mentioned devices (25) with the absorbing devices (26).

The mount (21) may have, further, one or more securing devices (28), e.g., upright index pins, at the carrier (24), which are used to detect fitting and corresponding component carriers (4) and mesh with corresponding shape features on the body (19), e.g., index openings. The securing devices (28) may likewise be arranged in the vicinity of the positioning devices (27) and the support and absorbing elements (25, 26).

As is illustrated in FIG. 3, a securing device (36), which is not shown specifically and is symbolized by an arrow, may be additionally arranged at the mount (21). FIG. 3 shows for this a plurality of mounting openings in the carrier (24), in which a controllable lifting pin or the like, which acts as a release securing device (36) and may be part of the above-mentioned safety device for checking the correct loading of the component carrier (4), may be arranged. The release securing device (36) dips down and releases the component carrier (4) for the travel on the feed path (6) only when the sensor system detects and reports correct loading.

In addition, one or more directing devices (29), which are designed as oblique sliding surfaces, may be present for prepositioning a component carrier (4). One or more directing devices (29) may be arranged stationarily at the guide path (6) and/or at the mount (21). They may act both in the placement position (37) and possibly also in the transfer position (38) and ensure lateral guiding of the component carrier (4).

The above-mentioned operating device (23) is arranged at the mount (21) in the embodiments being shown. It has a mobile, especially extractable grip (33) with a restoring unit (35), e.g., a restoring spring, and with a locking device (34). As is illustrated in FIGS. 4 and 8, the locking device (34) interacts with the guide path (6) and an upright support area, which is present there and which has, e.g., a vertical groove of a keyhole shape, which groove is indicated in FIGS. 3 and 4. The grip (33) has a rearward broadened collar and is arranged at the end at a thin rod displaceable against the force of the restoring device (35). The locking device (34) acts in the placement position (37), and the thickened collar is in contact in the broadened inlet area of the keyhole nut and thus supports the mount (21) on the side located opposite the bearing (30). As a result, it has a stable position during the placement of the component carrier (4).

Figure 9:
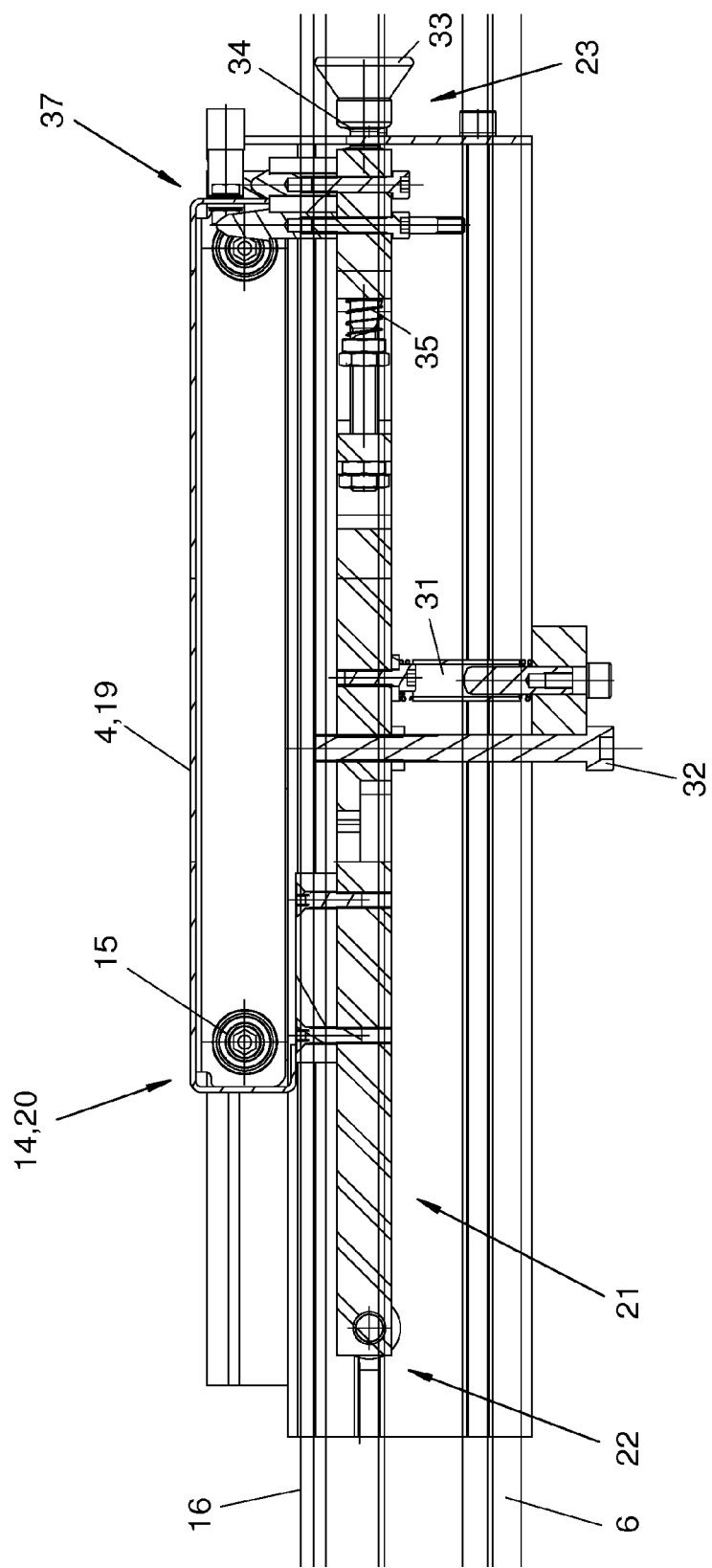
FIG. 9 is a view showing the prepositioning device in another of different operating positions during the positioning and transfer of a component carrier to a guide path.
Figure 10:
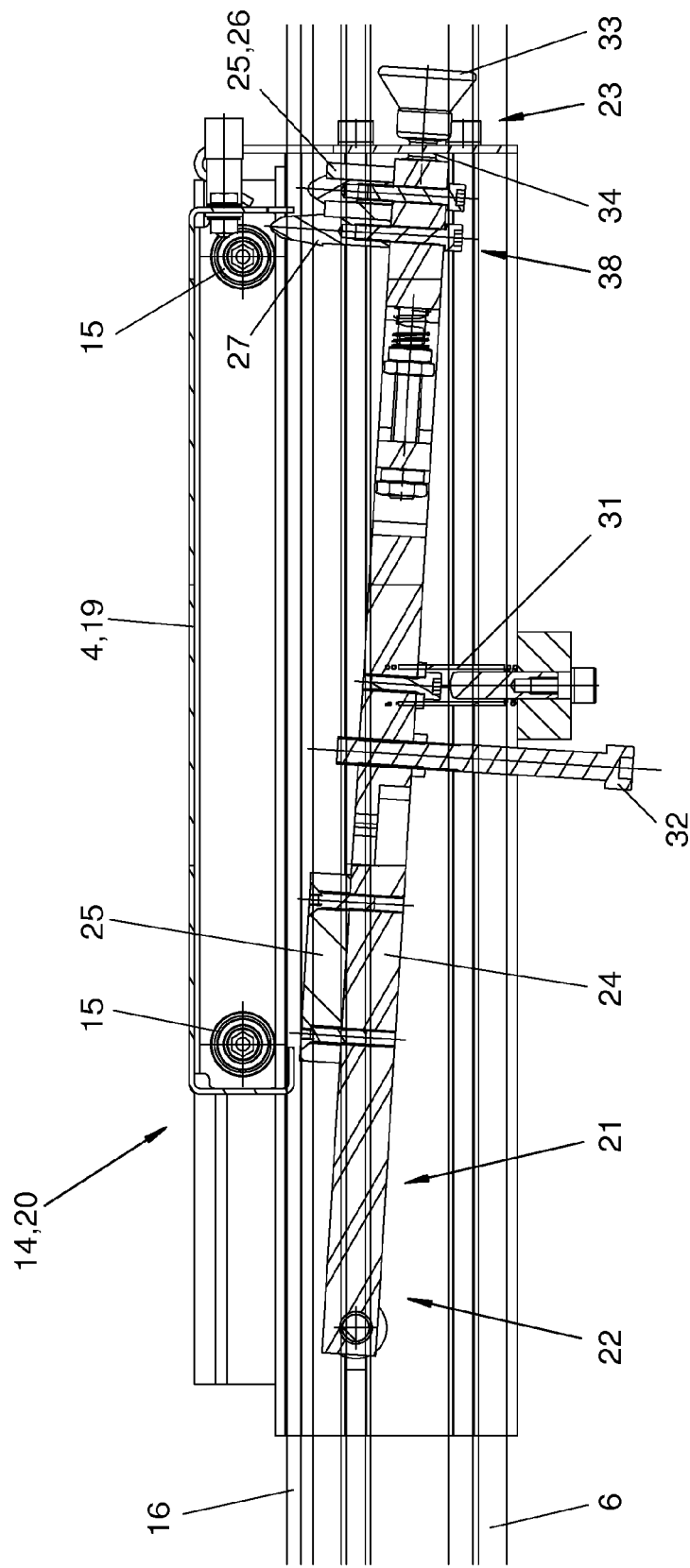
FIG. 10 is a view showing the prepositioning device in another of different operating positions during the positioning and transfer of a component carrier to a guide path.

FIG. 8 likewise shows this placement position (37) with closed locking device (34). When the component carrier (4) shall subsequently be transferred, the grip (33) is pulled, and the thickened collar disengages the keyhole groove and the thinner rod can enter the lower, narrow groove area. FIG. 9 illustrates this intermediate position. The locking device (34) is opened hereby, as a result of which the mount (21) loses its lateral support and the operator (12) can pivot the mount (21) downward into the transfer position (38) shown in FIG. 10. The component carrier (4) is now separated from the mount (21) and is transferred to the guide path (6) as well as placed on the guiding device (16) thereof with its rolling bodies (15). As soon as the component carrier (4) has left the prepositioning device (20), the restoring element (31) presses the mount (21) again upward into the placement position (37), and the locking device (34) closes automatically and establishes a stable support position.

The feed device (1) described may be arranged according to FIG. 1 at a machining station (2), which is surrounded by a protective device (9), e.g., a fence, for reasons of accident prevention. The feed device (1) is used to feed components (3) from the outside into the machining station (2) as well as to the machining device (13) safely without accidents and extends through a correspondingly contoured opening in the protective device (9). The loading site (10) is located outside and the unloading site (11) inside the protective device (9).

Various variants of the embodiments shown and described are possible. In particular, the features of the different exemplary embodiments may be combined and transposed with one another in any desired manner.

The transfer device (14) at the loading site (10) may be designed as a lifting device (39) or as a prepositioning device (20). A combination of the two devices (20, 30) is also possible, e.g., for reasons of redundancy or for a changeover or for feeding new component carriers (4). The prepositioning device (20) may be arranged, e.g., on a mobile path section (41).

The sliding and guiding devices (15, 16) may vary. The sliding devices (15) may have, e.g., low-friction sliding elements, which are usually sensitive to shocks, or slidable coatings. Any desired association and transposition between guide path (6, 7) and component carrier (4) is possible here as well. The guiding devices (16) may also have a different design. They may be formed by flat guide or sliding bars or in any other suitable manner.

While specific embodiments of the invention have been shown and described in detail to illustrate the application of the principles of the invention, it will be understood that the invention may be embodied otherwise without departing from such principles.

The invention claimed is:

1. A feed device for feeding components, the feed device comprising:
   a downwardly sloped guide path;
   a mobile component carrier detachably connected with the guide path, the component carrier having at last one mount for mounting one or more components on the component carrier;
   interacting sliding and guiding devices comprising rolling bodies and rails, on the guide path and on the component carrier;
   a loading site, at which a component carrier is connected by a worker with the guide path or connected by a worker with the guide path and loaded with one or more components;
   a restoring element; and
   a manually operable transfer device at the loading site, the transfer device being actuatable with an application of manual force against the restoring element for the positioned transfer of a component carrier to the guide path.

2. A feed device in accordance with claim 1, wherein the transfer device comprises a prepositioning device for a loose component carrier, at which the component carrier can be placed by the worker with an initial distance from the guide path in a predetermined position and temporarily fixed and can be subsequently transferred to the guide path while the sliding and guiding devices mesh.

3. A feed device in accordance with claim 2, wherein the prepositioning device has a mount movable relative to the guide path for a component carrier and a manually operable moving device actuatable by manual force for the mount.

4. A feed device in accordance with claim 3, wherein the mount is movable between an elevated placement position and a lowered transfer position, wherein the sliding and guiding devices are located at spaced locations in the placement position and mesh in the transfer position.

5. A feed device in accordance with claim 3, wherein:
   the moving device has an operating device and a restoring element;
   the mount has a pivot bearing;
   the mount is arranged in the guide path and is mounted at the guide path;
   the mount has support and positioning devices comprising bases and pins, for a component carrier.

6. A feed device in accordance with claim 1, wherein a support device has an absorbing element.

7. A feed device in accordance with claim 3, wherein the mount has a securing device, comprising an index pin, for the detection of fitting component carriers.

8. A feed device in accordance with claim 2, wherein the prepositioning device has directing devices for the component carrier.

9. A feed device in accordance with claim 1, wherein the restoring element comprises a spring and has a stop.

10. A feed device in accordance with claim 3, wherein the operating device is arranged at the mount and has a movable grip with a restoring with a spring, and with a locking device.

11. A feed device in accordance with claim 1, further comprising a safety device comprising a release securing device with a lifting pin, for controlling the motion of a component carrier.

12. A feed device in accordance with claim 1, wherein the sliding devices are arranged at the component carrier and comprise rolling bodies, especially wheels.

13. A feed device in accordance with claim 1, wherein the guiding devices are arranged at a guide path and comprise rails.

14. A feed device in accordance with claim 1 wherein the sliding and guiding devices have, at least in some areas, a mutually adapted uneven contour for positive-locking meshing.

15. A feed device according to claim 1 in combination with a protective device wherein the guide path extends through an opening in the protective device.

16. A method or feeding components, the method comprising the steps of:
   providing a feed device, which has a downwardly sloped guide path, a mobile component carrier path having at last one mount for mounting one or more components on the component carrier, the component carrier being detachably connected with the guide path and interacting sliding and guiding devices comprising rolling bodies and rails, on the guide path and on the component carrier, wherein the feed device has a loading site, at which a component carrier is connected by a worker with the guide path or the component carrier is connected by a worker with the guide path and loaded with one or more components, a restoring element and a manually operable transfer device at the loading site, the transfer device being actuatable with an application of manual force against the restoring element for the positioned transfer of a component carrier to the guide path;
   positioning a component carrier at the loading site by means of the manually operated transfer device actuated by manual force against a restoring element;
   transferring the positioned component to the guide path.

17. A method in accordance with claim 16, wherein a loose component carrier is placed by the worker on a transfer device designed as a prepositioning device with an initial distance from the guide path in a predetermined position and temporarily fixed and is subsequently transferred to the guide path while sliding and guiding devices mesh.

18. A feed device for feeding components, the feed device comprising:
   a downwardly sloped guide path;
   a feed path;
   a mobile component carrier detachably connected with the guide path;
   interacting sliding and guiding devices comprising rolling bodies and rails, on the guide path and on the component carrier;
   a loading site, at which a component carrier is connected by a worker with the guide path or connected by a worker with the guide path and loaded with one or more components;
   a restoring element; and
   a manually operable transfer device at the loading site, the transfer device being actuatable with an application of manual force against the restoring element for the positioned transfer of a component carrier to the guide path, wherein the transfer device comprises a lifting device for a lifting transfer of the component carrier from the feed path to the guide path with an upward or downward lifting motion having a vertical direction component.

19. A feed device according to claim 18, wherein the lifting device comprises a path section of the guide path, the path section with the component carrier arranged on the path section being transferred from the feed path to the guide path with a lifting movement in a vertical direction.

20. A feeding device according to claim 19, wherein:
   the path section forms a flush docking end portion of each of the feed path and the guide path;
   the lifting device further comprises a coupling device to couple the path section with the feed path and the guide path respectively and secure and lock the path section respectively to the feed path and the guide path in a coupled position; and
   the lifting device further comprises a slope adaptation device for changing a slope of the path section during the lifting movement to adapt the slope of the path section with a slope of the feed path and the guide path.

* * * * *